(12) United States Patent
Karem et al.

(10) Patent No.: US 11,760,473 B2
(45) Date of Patent: Sep. 19, 2023

(54) ROTORCRAFT WITH INTERCHANGEABLE ROTOR DIAMETERS

(71) Applicant: Karem Aircraft, Inc., Lake Forest, CA (US)

(72) Inventors: Abraham Karem, Santa Ana, CA (US); John Paul Parcell, Irvine, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 0 days.

(21) Appl. No.: 17/174,062

(22) Filed: Feb. 11, 2021

(65) Prior Publication Data

US 2022/0266996 A1    Aug. 25, 2022

(51) Int. Cl.
| | |
|---|---|
| *B64C 29/00* | (2006.01) |
| *B64F 5/00* | (2017.01) |
| *B64C 27/46* | (2006.01) |
| *B64C 1/06* | (2006.01) |

(52) U.S. Cl.
CPC .......... *B64C 29/0033* (2013.01); *B64C 1/063* (2013.01); *B64C 27/463* (2013.01); *B64F 5/00* (2013.01)

(58) Field of Classification Search
CPC ....... B64C 2211/00; B64C 29/003; B64F 5/00
See application file for complete search history.

(56) References Cited

U.S. PATENT DOCUMENTS

| | | |
|---|---|---|
| 6,007,298 A | 12/1999 | Karem |
| 6,641,365 B2 | 11/2003 | Karem |
| 7,246,998 B2 | 7/2007 | Kovalsky et al. |
| 9,045,226 B2 | 6/2015 | Piasecki et al. |
| 10,633,087 B2 * | 4/2020 | McCullough .......... G05D 1/101 |
| 2001/0001033 A1 | 5/2001 | Karem |
| 2016/0272310 A1 | 9/2016 | Chan |

(Continued)

FOREIGN PATENT DOCUMENTS

JP    2002532340    10/2002

OTHER PUBLICATIONS

Length-Morphing Rotor Ready to Provide Helicopter Versatility, Popular Mechanics, Oct. 1, 2007 Breakthrough Awards.

(Continued)

*Primary Examiner* — Philip J Bonzell
(74) *Attorney, Agent, or Firm* — Fish IP Law, LLP

(57) ABSTRACT

A tiltrotor aircraft is designed to accommodate rotors of different diameters, as well as corresponding wings and fuselages with different span and length, while maintaining very high parts commonality, especially with respect to drive train and power source. This enables design and operation of a fleet of such aircraft with significantly different rotor diameters, which are nevertheless optimized for different missions. In preferred embodiments the rotors are configured to have high stiffness and low weight to reduce aero-structural dynamic issues across the fleet. Also in preferred embodiments drive systems are designed for a full range of speed, torque, and power associated with all intended rotors. Turboshaft engine speeds are restricted to a narrow RPM range, so that a single gearset can be replaced to achieve the desired rotor RPM. Also in preferred embodiments, aircraft in a fleet can differ in folded length, empty weight, payload length by up 50%.

4 Claims, 9 Drawing Sheets

(56) References Cited

U.S. PATENT DOCUMENTS

| | | |
|---|---|---|
| 2018/0334251 A1 | 11/2018 | Karem |
| 2019/0127050 A1 | 5/2019 | Takacs |
| 2019/0270516 A1* | 9/2019 | Sinusas .................. B64C 27/20 |
| 2020/0255136 A1* | 8/2020 | Karem .................. B64U 30/20 |
| 2021/0031908 A1* | 2/2021 | Sinusas .................. B64C 27/00 |

OTHER PUBLICATIONS https://www.researchgate.net/publication/334497907; Design and Trajectory Control of Universal Drone System; Measurement Jul. 2009; p. 117.
Aerodynamic Study of a Small, Ducted VTOL Serial Vehicle; Kyrilian Dyer; S.B Mechanical Engineering, MIT 2000 pp. 1-121.
https://upload.wikimedia.org/wikipedia/commons/9/92/A32XFAMILYv10.png; 1 page.
https://vtol.org/files/dmfile/JMR_Bell-Vertiflite.pdf; 4 pages.
International search report dated May 30, 2022, for related PCT application No. PCT/US2022/015833. 10 pages.

\* cited by examiner

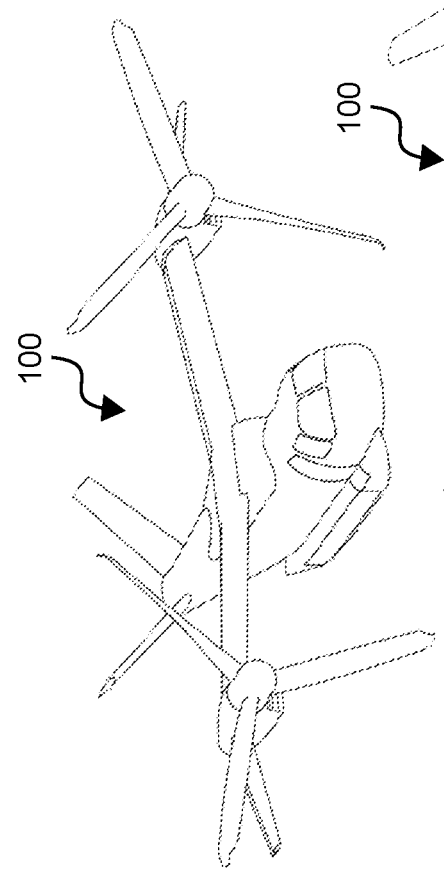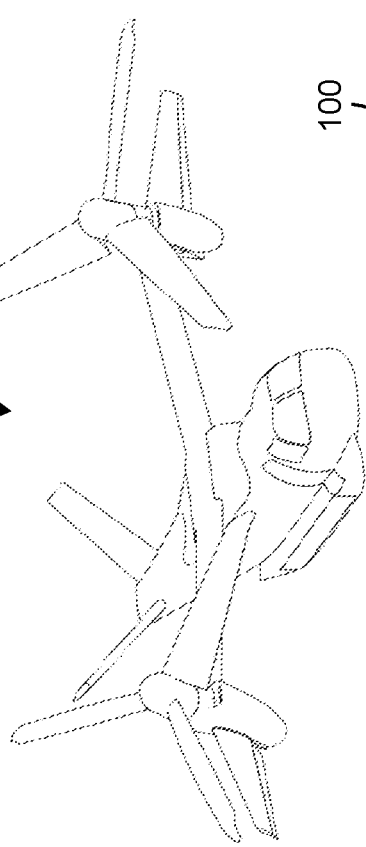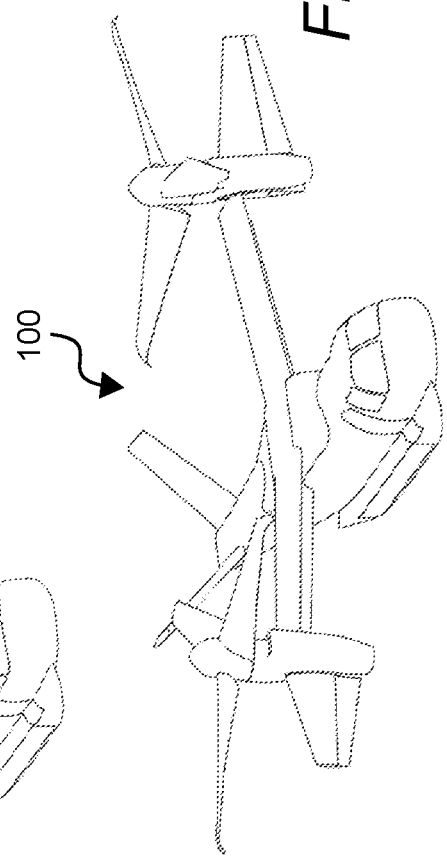

ROTORCRAFT WITH INTERCHANGEABLE ROTOR DIAMETERS

FIELD OF THE INVENTION

The field of the invention is a tiltrotor aircraft.

BACKGROUND

The following description includes information that may be useful in understanding the currently disclosed subject matter. It is not an admission that any of the information provided herein is prior art or relevant to the presently claimed invention, or that any publication specifically or implicitly referenced is prior art.

Tiltrotor aircraft are a unique type of aircraft which are capable of changing geometry in flight to provide hover capability and wingborne cruise flight in the same platform. Prior art consists primarily of tiltrotor aircraft designs which have existed only as limited production experimental demonstration vehicles. Two exceptions exist: the Bell Boeing V-22 for military applications with a fleet size of 375 aircraft and the AgustaWestland AW-609 which is currently undergoing civilian and military certification. While these tiltrotors, like most aircraft, are suited to a variety of missions, the rotor diameter of each design is kept constant for all missions and variants.

Most aircraft development programs capitalize on multiple customers by creating variants of a baseline design best suited to each customer's requirements. Prior art covers many instances of components such as mission equipment and engines installed on the aircraft variants. An example is the two variants of the Sikorsky S-70: A ship-based MR-60R Seahawk® equipped for anti-submarine/anti-surface warfare, and the civilian S-70 Firehawk® for firefighting. Fuselage variants also exist, typically by adding a "plug" to lengthen the fuselage as on the Airbus A320 variants. See https://upload.wikimedia.org/wikipedia/commons/9/92/A32XFAMILYv1.0.png. Significant commonality can be maintained, and consequently development and recuring costs are minimized by anticipating these variants in the initial design.

A specific example of the desire for aircraft variants is the shared desire of the Army and Navy to develop a new vertical takeoff and landing (VTOL) aircraft. While many requirements, such as carrying troops and weapons at high speed are shared, some key differences challenge the goal of commonality. A large rotor diameter is desired for best hover capability. The Army flies from open fields and runways which do not constrain the rotor diameter, so a large rotor diameter is optimal. The Navy requires its aircraft to takeoff, land, and stow onboard its ships. Clearances to superstructure and other aircraft limit the allowable rotor diameter. It would therefore be beneficial to provide variations of a tiltrotor aircraft with different rotor diameters.

However, a change in the diameter of a lifting rotor, such as on a tiltrotor aircraft, is not accommodated for in baseline designs due to the challenge of dynamics and vibration which require precise design and thorough evaluation. Additionally, a conventional tiltrotor aircraft with a fully articulated or semi-rigid rotor is limited in maximum flight speed by the onset of whirl flutter. This is characterized by unstable aero-structural interaction between the rotor and the wing. Modifications to the wing or rotor, especially wingspan and rotor diameter, of a conventional tiltrotor aircraft significantly impact whirl flutter characteristics. A change in the required rotor diameter invokes a change in inboard wing-span to preserve fuselage to rotor clearance. This motivates a full redesign and reevaluation of the aircraft including its propulsion system.

A person of ordinary skill in the art attempting to satisfy the Army and Navy requirements would choose a single rotor diameter allowed by both services and therefore compromise the potential benefits of a different rotor design for each service. This happened in the JVX program, the Army-Navy joint program which eventually produced the V-22, the only mass-produced tiltrotor in existence. The V-22's rotor is about five feet smaller in diameter than ideal for the Army requirements as described in the following quote:

"V-22 rotor diameter was constrained by shipboard operation. Required to taxi past the superstructure of such ships with its rotors no less than 12 feet 8 inches (3.9 m) away from the "island" and its outboard tires at least five feet inboard from the edge of the deck, the V-22's proprotors could be no more than 38 ft (12 m) in diameter—about five feet less than ideal for an aircraft that size, according to engineers working on the project at the time." https://vtol.org/files/dmfile/JMR_Bell-Vertiflite.pdf One approach to improve efficiency of a tiltrotor is an in-flight varying of rotor diameter. The narrow range of engine RPM motivates a variable rotor diameter. A larger diameter setting, and therefore larger disk area, is used in hover when high rotor thrust is required. Diameter is reduced for wingborne cruise when thrust demand is lower. Multiple instances of prior art describe a variable diameter rotor which allowed varying rotor disk area in flight. US Patent USD401898S describes the aircraft envisioned by Sikorsky Aircraft Corp using a Variable Diameter Tiltrotor (VDTR) in the 1990s. This prior art was aimed exclusively at providing a large rotor diameter for hover and for rotor edgewise flight (like a helicopter) and for reduced rotor diameter to allow tilting and fuselage clearance. While Sikorsky did ground testing of VDTR subsystems the high rotor system complexity and flight safety risks made applications of VDTR undesirable.

Additional research by Farhan Gandhi at Penn State University describes a variable diameter tiltrotor aircraft where centrifugal forces within the rotor control the diameter, meaning rotor diameter and rotational speed (RPM) are proportional. See Gandhi, Farhan, "Length-Morphing Rotor Ready to Provide Helicopter Versatility", Popular Mechanics, Oct. 1, 2007 Breakthrough Awards. This aircraft is designed for the full range of rotor diameters of the rotor system.

A particular challenge of this concept is the extremely large force required to control the blade extension and retraction. The diameter control mechanism and duplicate structure associated with an extendable rotor blade prohibit a lightweight, stiff rotor as contemplated herein. Consequently, these examples of prior art did not include an interchangeable rotor with different diameter. U.S. Pat. No. 9,045,226 covers aircraft variants which change fuselage modules, wing configurations, and rotor configurations. The rotors are extendable in a telescoping manner like those in the Sikorsky patent. This feature is used to reduce the ground footprint of the vehicle when the rotor is stopped.

Prior art covers an extension of the structure connecting two rotors. Erciyes University describes a multicopter drone system where arms extending to the rotors are exchanged for different lengths. While changes such as arm length or rotor diameter on a small scale (approx. 20 kg and 18 inch rotor diameter) multicopter are commonplace, this becomes challenging at larger scales described in the present patent. Rotor development and evaluation for rotor diameters in the range of 12 to 80 feet or more, described herein, take years of analysis and testing for each configuration.

Prior art includes helicopters with rotor systems which have a different blade count. The MD Helicopters MD520N and MD600 are an example of this. The MD520N has a 5 bladed main rotor. The maximum takeoff weight, power, and fuselage size were increased for the MD600. This motivated a higher blade count rotor with 6 blades. An additional blade does not significantly impact the dynamic characteristics of the blade, and the application to a helicopter rather than a tiltrotor aircraft means coupled dynamics with a wing structure are not considered. These rotor systems are not interchangeable between models, and the other aircraft systems such as the engine and transmission are specific to each rotor type.

Other examples of interchangeable rotor geometries exist. U.S. Pat. No. 7,246,998 B2 describes a helicopter rotor with a replaceable tip segment. It suggests a replaceable tip segment from 87% radius to the tip. The inventive subject matter replaces the entirety of the rotor blade, such that the characteristic dimensions, including rotor diameters, are significantly different after replacement.

Some developmental rotorcraft featured differing rotor diameters which were introduced to solve dynamic instabilities or modify performance. An example of a tiltrotor is the Bell XV-3 of 1955-1962. Initial rotors of XV-3 had three fully articulated blades per rotor with 25-foot diameter. Serious flutter problems with the three bladed rotors in the wind tunnel motivated replacing them with two bladed, semi-rigid rotors with 24-foot diameter. See http://www.a-viastar.org/helicopters_eng/bell_xv-3.php.

While propeller aircraft may be certified for multiple interchangeable propeller options, each propeller type must be certified to the FAA with a Supplemental Type Certificate. "An STC will probably be required if a significant amount of analysis or flight tests are required, or if extensive flight manual changes are necessary." See FAA AC 21-40 Even though it is known for fixed-wing aircraft to change propeller types/sizes, doing so with a rotorcraft is much more challenging because natural frequencies of large rotors and wing structures are conventionally closely spaced, resulting in whirl flutter concerns.

The prior art teaches lightweight stiff rotor blades. The low mass and high stiffness of such blades mitigate the aero-structural concerns associated with traditional rotors. The behavior of high stiffness rotors is predictable and critical frequencies of the wing and rotor are separated to avoid interaction. A stiff rotor system can vary its rotational speed (RPM) in flight to provide best efficiency without compromising hover performance. This enables large rotor diameter rotors to be used for efficient wingborne flight on a tiltrotor. See U.S. Pat. No. 6,007,298 (Karem, OSR), and U.S. Pat. No. 6,641,365 (Karem, OSTR).

The '298 and '365 patents, as well as all other extrinsic materials discussed herein are incorporated by reference to the same extent as if each such materials were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which an aircraft with tilting rotors is designed to accept rotors of different diameters, as well as corresponding wings and fuselages with different span and length, respectively.

Aircraft variants designed for specific missions can each benefit from a specific rotor diameter. A small rotor can be motivated by maximum allowable folded dimensions for storage onboard a ship. A large rotor is motivated by carrying heavier payloads or more fuel with the same power. A preferred embodiment has replaceable rotors that provide significantly different rotor diameters for different missions, while maintaining commonality in most aircraft systems, including the powerplant, drivetrain, and structural interfaces.

Drive systems contemplated herein are designed for the full range of speed, torque, and power associated with all intended rotors. Turboshaft engine speeds are restricted to a narrow range, so a single gearset is replaced to achieve the desired rotor RPM. Except for the single replaced gearset, the drivetrain in each nacelle is common between variants.

The inboard wingspan between nacelles is extended for a larger rotor to maintain acceptable rotor to fuselage clearance. Interfaces from wing to nacelle and from wing to fuselage are common between variants. This allows interchangeable wing and nacelle systems with different diameter rotors.

If payload density is consistent between variants, a larger fuselage payload volume is desired for a variant with higher payload weight capacity. A fuselage extension of the constant cross-section segment provides increased fuselage volume. The wing to fuselage interface is common between variants, and fuselage internal features such as tie downs or seats are replicated in the extended portion of the fuselage.

BRIEF DESCRIPTION OF THE DRAWING

FIGS. 2A-2C are perspective views of the aircraft of FIG. 1, showing a range of nacelle tilt orientations.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems, and methods in which a tiltrotor aircraft is designed to accommodate interchangeable rotors of dissimilar diameters. Preferred embodiments include a fleet of at least two of such aircraft, each with rotors with different diameters. More preferred embodiments of fleets contain three, four, five or more of such aircraft.

Figure 1:
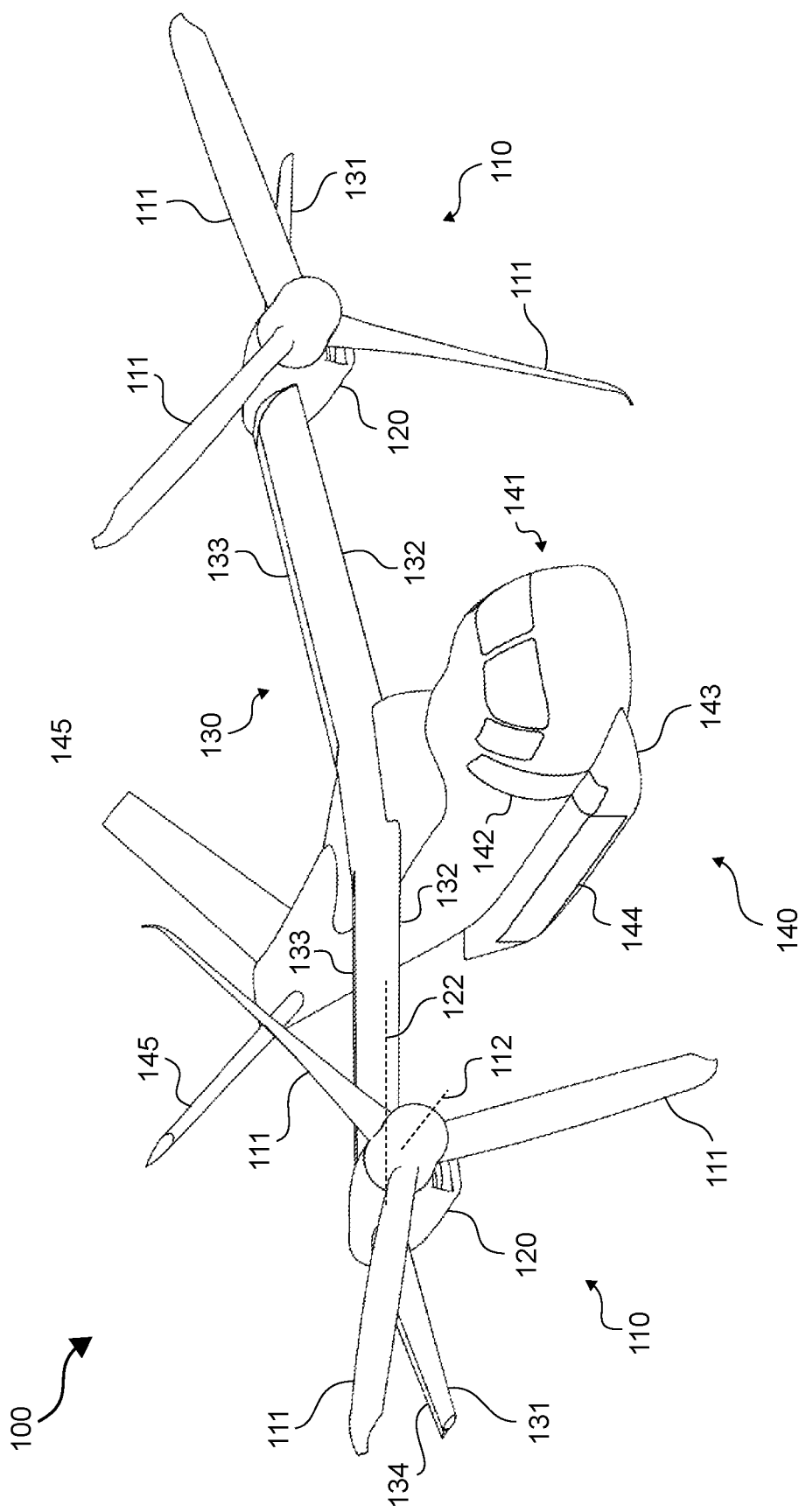
FIG. 1 is a perspective view of a preferred aircraft in wingborne flight configuration.

FIG. 1 depicts a preferred aircraft, 100, in the wingborne mode of operation, comprising a wing 130, a fuselage 140, and first and second rotors 110 comprising multiple blades 111. The aircraft 100 is substantially symmetrical about the longitudinal centerline, such that, other than possibly being mirror images, the first and second rotors 110 and their respective blades are substantially identical.

The rotor blades are of a stiff hingeless type such as that described in U.S. Pat. No. 6,641,365. First rotor 110 rotates about axis 112 to generate thrust generally along the axis 112 and moments. First rotor 110 is mounted to a tilting nacelle 120 which rotates around a tilt axis 122 allowing operation across the range of rotorborne mode with rotor thrust pointed vertically through wingborne mode with the rotor thrust pointed forward. An outboard wing 131 is attached to a tilting nacelle 120. Outboard wing control surface 134 provides roll control and reduces wing loads in transition/conversion flight mode. An inboard wing 132 connects nacelle 120 to fuselage 140. It includes control surfaces 133 for controlling the attitude of the vehicle and reducing the download in hover. The fuselage 140 envisioned for a manned configuration includes a forward cockpit 141 and cabin doors 142. Sponsons 143 on each side of the fuselage 140 feature doors 144 which allow access to the sponson volume and provide surfaces for mounting internally carried payloads. Tail surfaces 145 are attached to the fuselage 140 and provide vehicle attitude control primarily in wingborne flight. The aircraft 100 is substantially symmetrical about the centerline, such that other than possibly being mirror images, nacelles 120, wings 130, and fuselage 140 features, are substantially identical.

FIGS. 2A-2C depict the range of nacelle tilt angles. FIG. 2A shows the aircraft 100 in wingborne mode operation. FIG. 2B shows the aircraft 100 in the intermediate transition/conversion mode operation. FIG. 2C shows the aircraft 100 in rotorborne mode operation.

Figure 3:
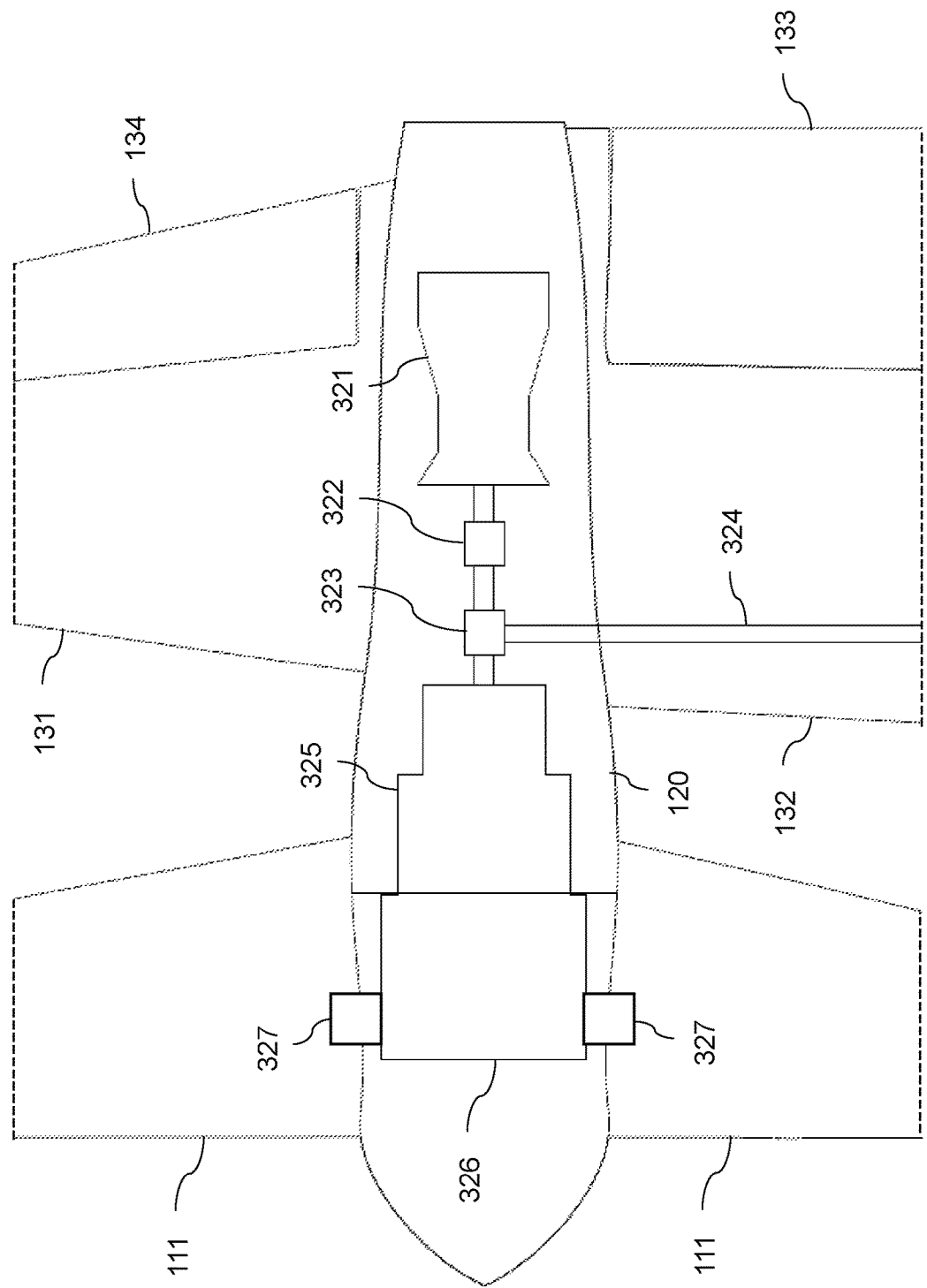
FIG. 3 is a top view section drawing of the nacelle and drivetrain of FIG. 1.

FIG. 3 shows a top view cross section view of nacelle 120 in wingborne orientation. The nacelle 120 contains the propulsion system comprising an engine 321, and various drivetrain elements: Output speed determining gearset 322, tilt-axis gearbox 323, cross wing driveshaft 324 and the reduction gearbox 325. The cross wing driveshaft 324 is aligned inside the inboard wing 132. The inboard wing 132 includes an inboard wing flap 133. The outboard wing 131 is attached to the nacelle and includes an outboard wing control surface 134.

Rotors of different diameter have different design rotational speeds, however turboshaft engines are limited to a narrow range of RPM. The output speed determining gearset 322 is a single gearset in the nacelle drivetrain which can be replaced for variant aircraft to maintain the desired gear ratio of engine RPM to rotor RPM. The tilt axis gearbox and cross wing driveshaft allow power transfer from one tilting nacelle across the wing to the other nacelle and rotor system. This is critical for flight safety in an engine out condition.

Figure 4A:
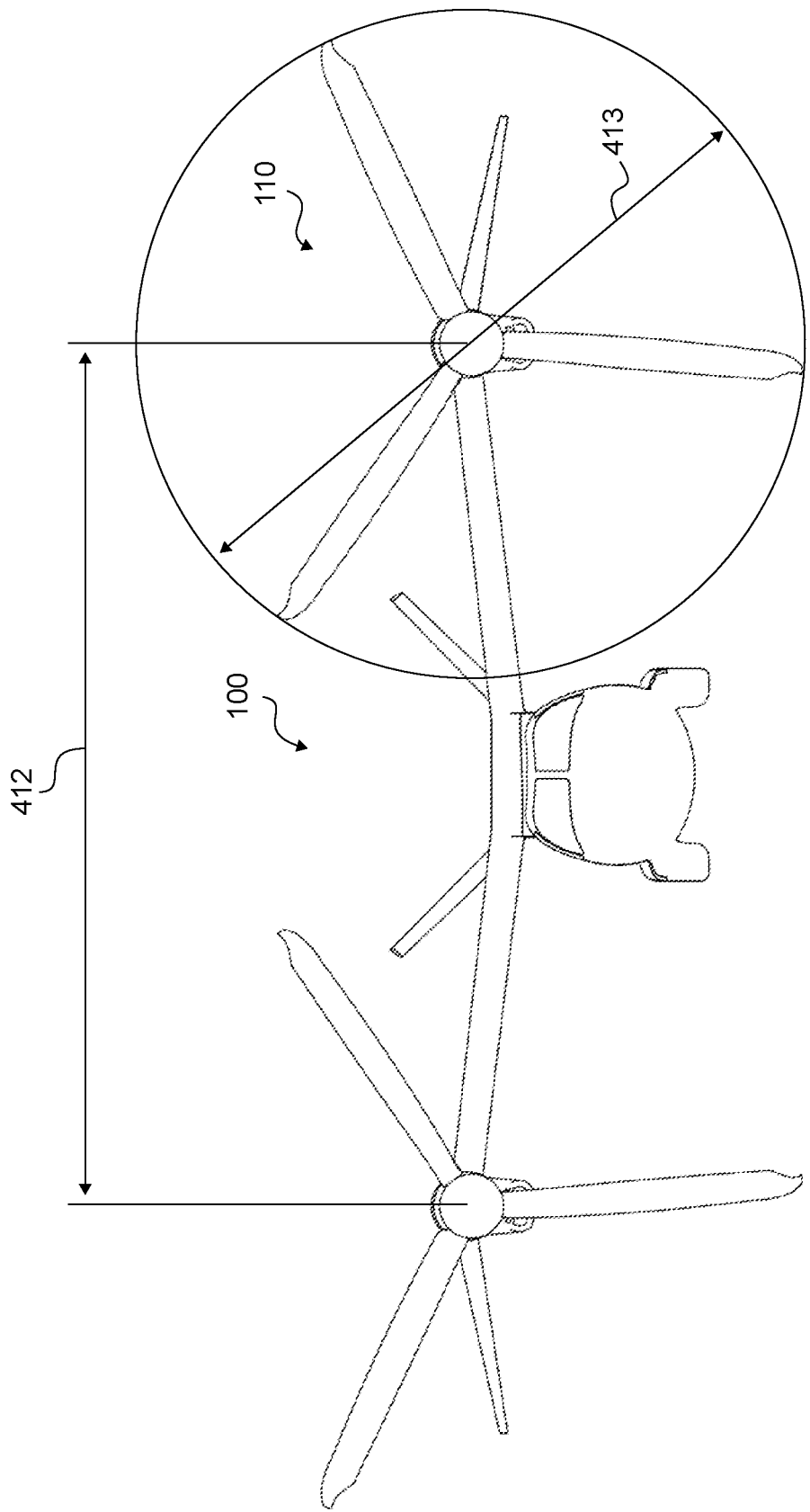
FIG. 4A is a front view of the aircraft of FIG. 1, in wingborne flight configuration.

The reduction gearbox 325 can contain a speed changing mechanism which allows selection of different rotor speeds for different flight conditions. The reduction gearbox 325 transmits torque to the rotor blades through a hub structure 326. Common interfaces 327 of rotor blades 111 to the hub structure 326 enable interchangeability of rotors with different diameter on variant aircraft FIG. 4A depicts a front view of aircraft 100 in wingborne mode operation. Rotor separation dimension 412 also defines the inboard wingspan. The circle swept by the blade tip of rotor 110 defines the rotor diameter dimension 413. First aircraft 100 has a rotor separation dimension 412 of 38 feet and a rotor diameter 413 of 29 feet.

Figure 4B:
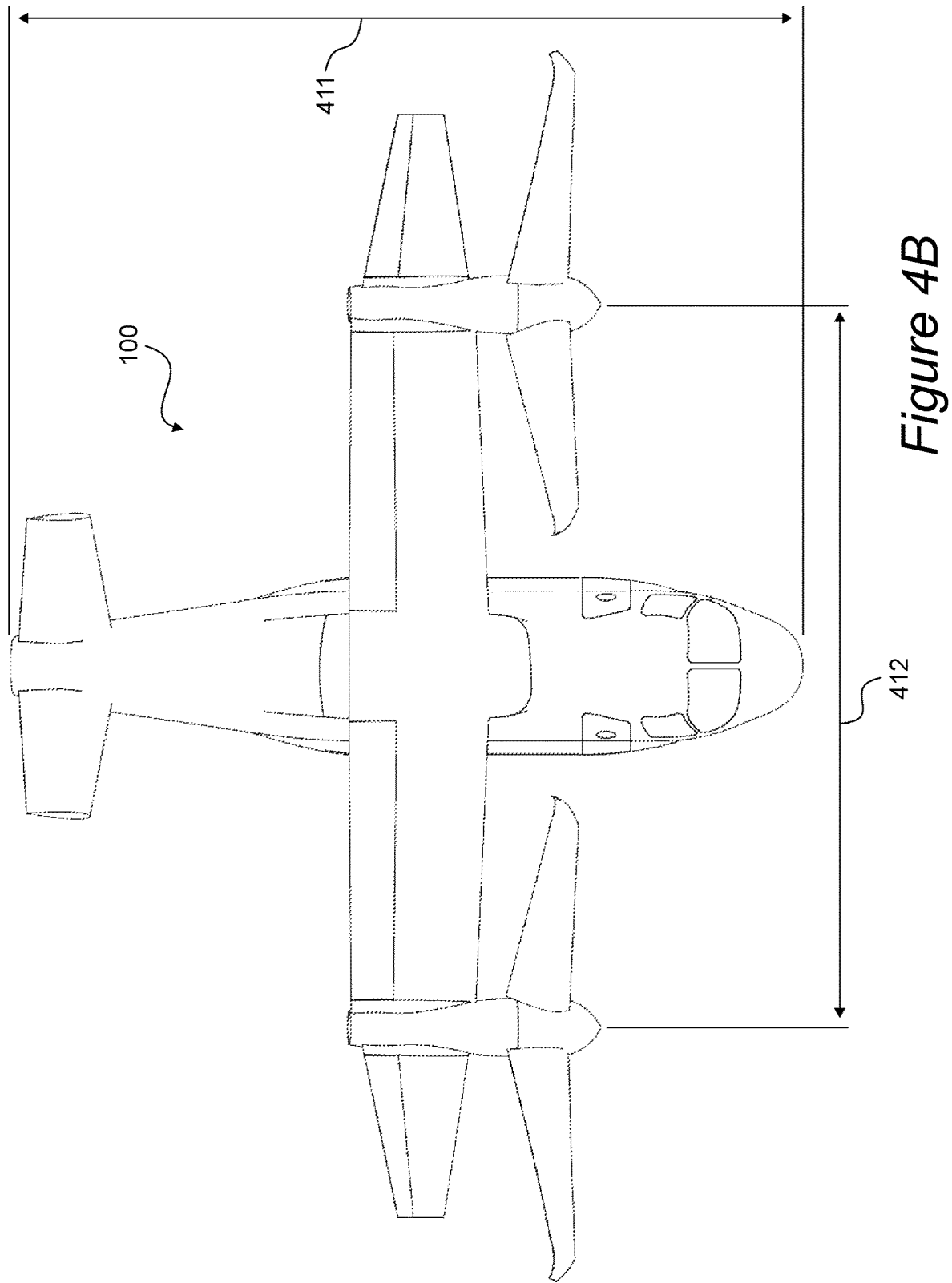
FIG. 4B is a top view drawing of the aircraft of FIG. 1, in wingborne flight configuration.

FIG. 4B depicts a top view of aircraft 100 in wingborne mode operation and depicts the fuselage length dimension 411. The first aircraft 100 has a fuselage length dimension 411 of 41.8 feet. Rotor separation dimension 412 is also shown in this view.

Figure 5A:
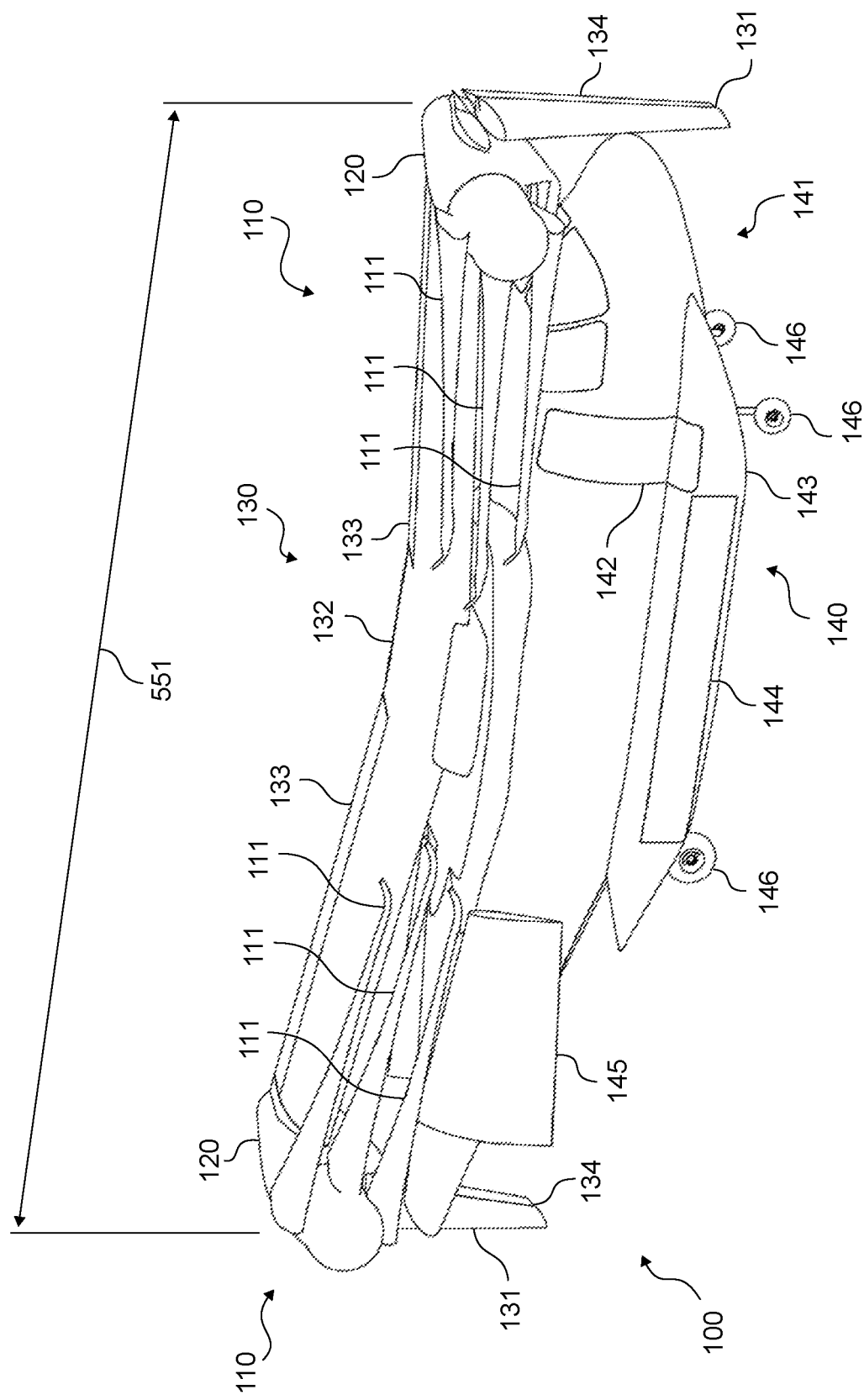
FIG. 5A is a perspective view of the aircraft of FIG. 1, in its folded configuration.

An especially important concern for a naval operator is the dimensions of the aircraft when on a ship. FIG. 5A depicts aircraft 100 folded to minimize its dimensions onboard a ship. Limited deck space constrains the width and length of an aircraft on a ship. The height of the aircraft may also be limited by an internal hangar dimension. Aircraft 100 folds various components to minimize its dimensions: outboard wings 131 with control surfaces 134 fold down to reduce total wingspan, rotor blades 111 fold toward the centerline, the entire wing/nacelle/rotor system rotates above the fuselage 140 to align the wingspan with the fuselage longitudinal direction, and tail surfaces 145 fold alongside the fuselage 140. Landing gear 146 are independently adjustable in height to minimize folded height while also providing necessary ground clearance during landing and loading. Aircraft 100 has a folded length dimension 551 of 42.5 feet.

Figure 5B:
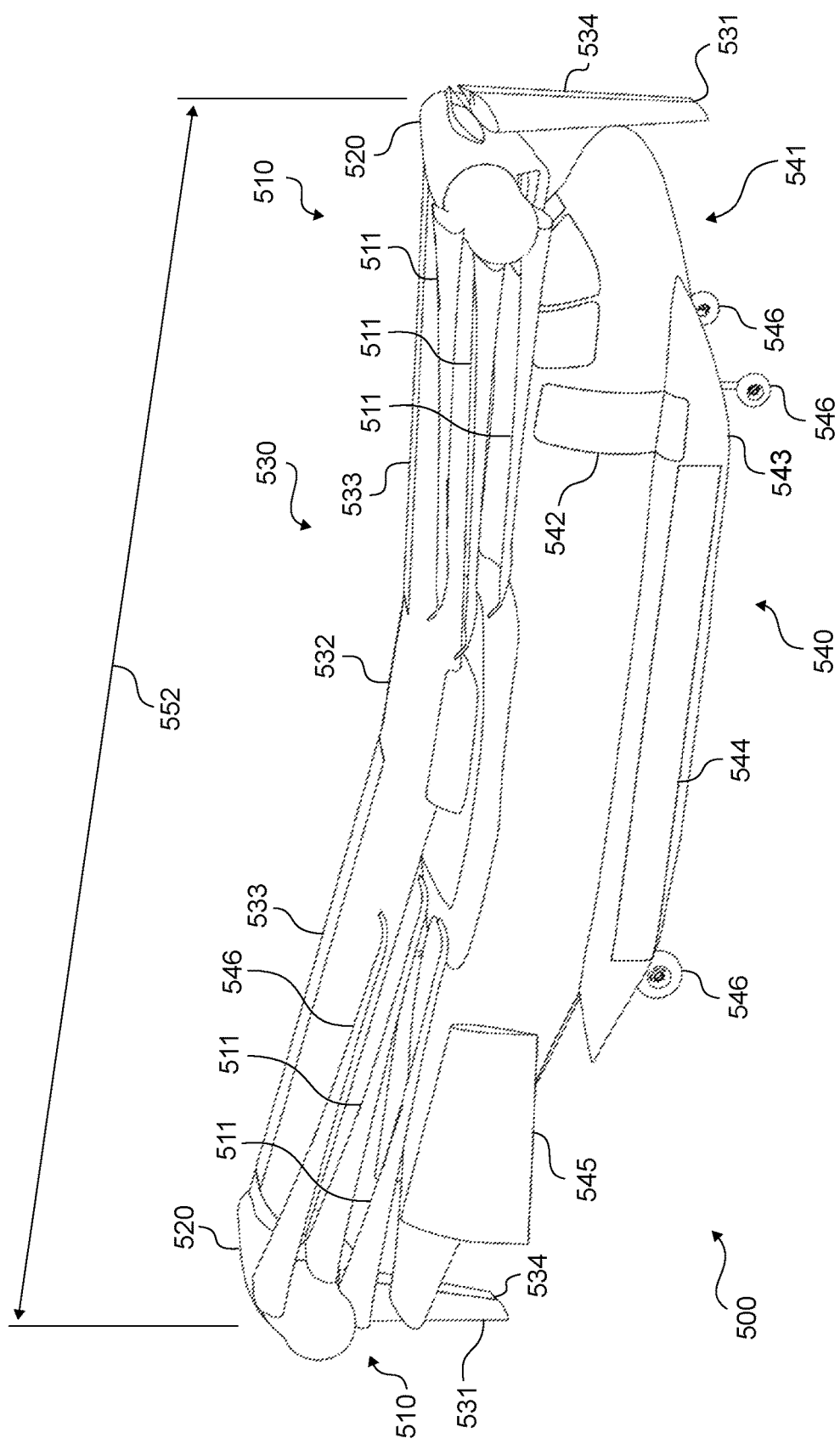
FIG. 5B is a perspective view of a variant aircraft having a larger rotor diameter, longer wingspan, and longer fuselage, in its folded configuration.
Figure 6A:
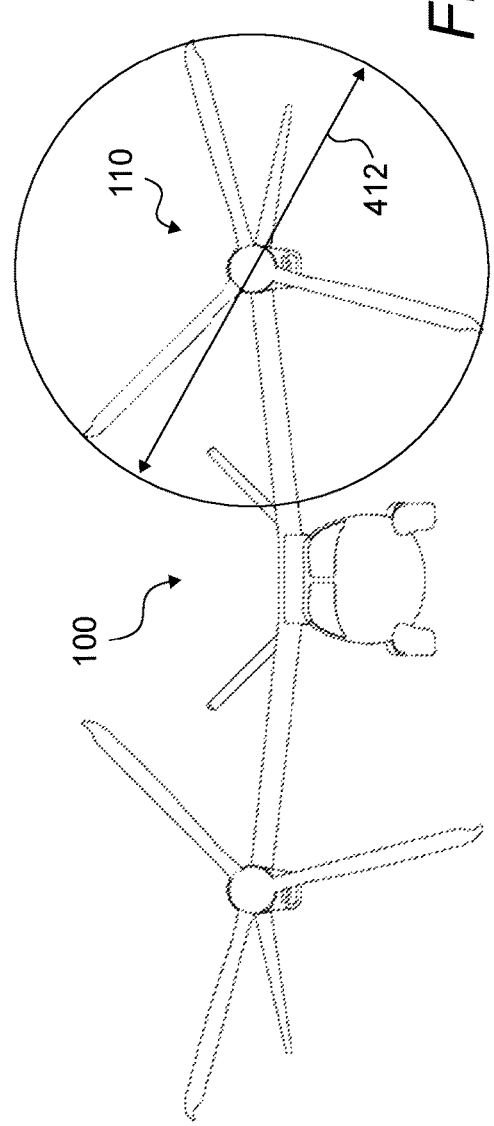
FIG. 6A is a front view of the aircraft of FIG. 1, in its unfolded configuration.
Figure 6B:
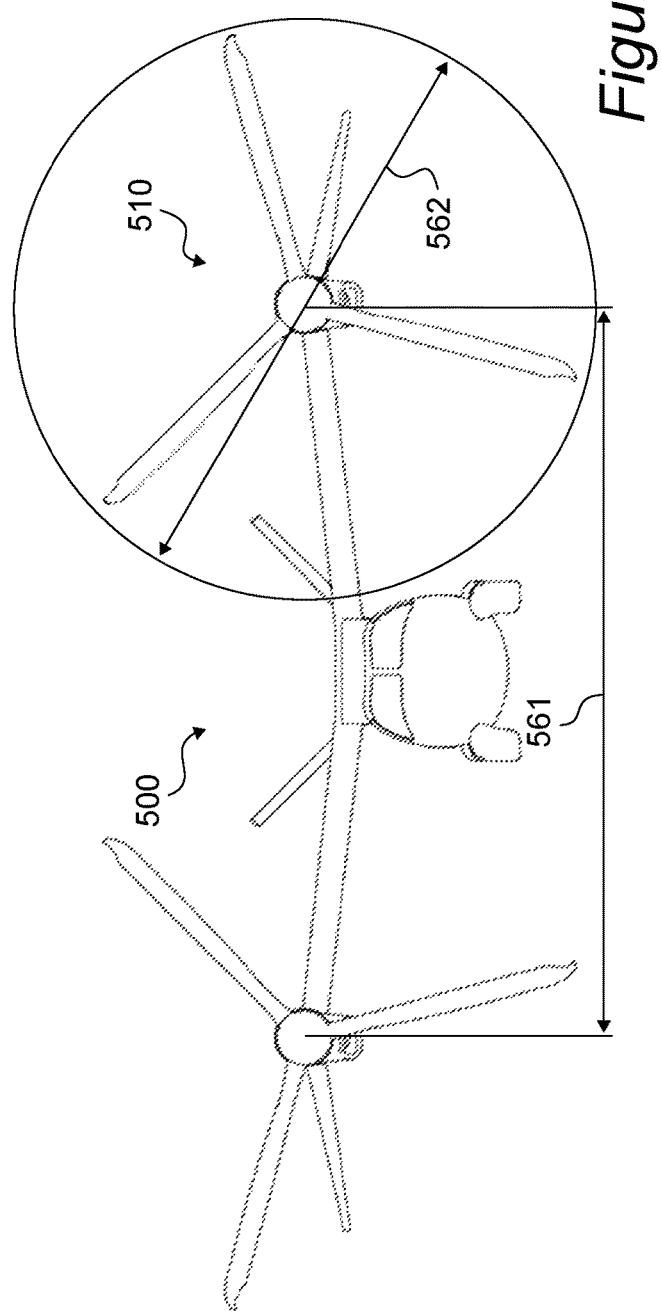
FIG. 6B is a front view of the variant aircraft of FIG. 5B, in its unfolded configuration.
Figure 7A:
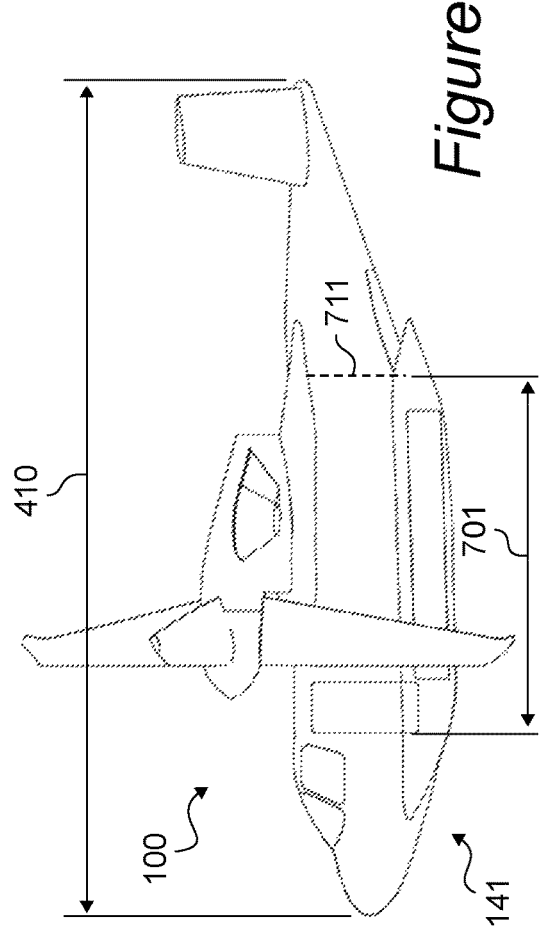
FIG. 7A-7B are side views of the aircrafts of FIGS. 6A and 6B, respectively.
Figure 7B:
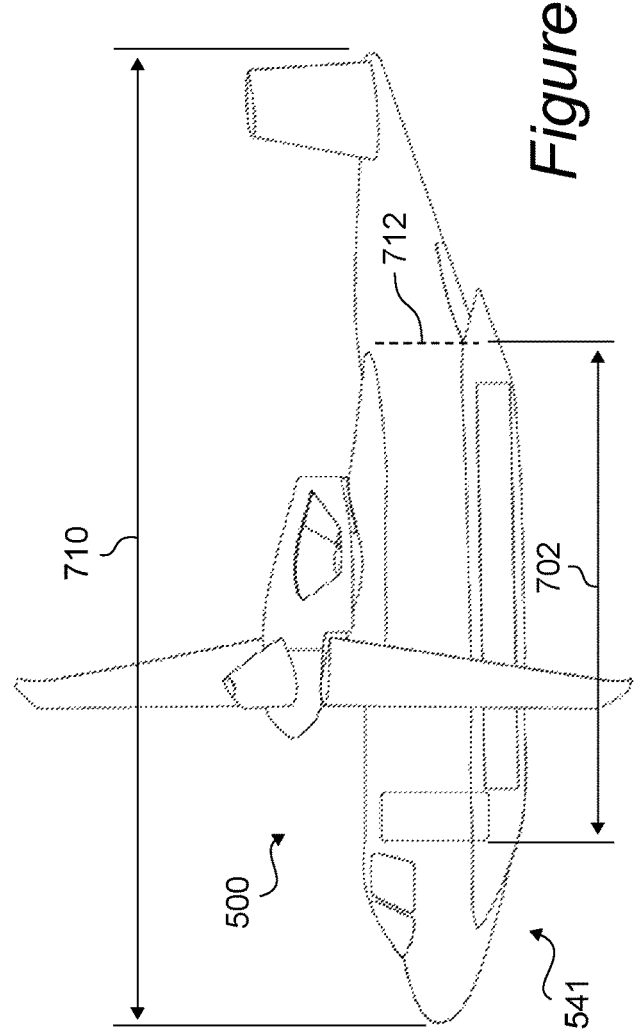

FIGS. 5B, 6B, and 7B show a second aircraft 500, not drawn to scale, but which should be interpreted with dimensions described herein. Second aircraft 500 has rotors 510 with rotor diameter dimension 562 of 36 feet. Its rotor separation dimension 561 is 45 feet. Aircraft 500 has a folded length dimension 552 of 49.5 feet.

FIG. 5B shows second aircraft 500 in its folded configuration. Second aircraft 500 comprises a wing 530, a fuselage, 540, and a first and second rotor 510 comprising multiple blades 511. Rotors are attached to nacelles 520. Outboard wings 531 with control surfaces 534 are also attached to nacelles 520. Inboard wings 532 with control surfaces 533 connect nacelles 520 to fuselage 540. The fuselage 540 envisioned for a manned configuration includes a forward cockpit 541 and cabin doors 542. Sponsons 543 on each side of the fuselage 540 feature doors 544 which allow access to the sponson volume and provide surfaces for mounting internally carried payloads. Tail surfaces 545 are attached to the fuselage 540 and provide vehicle attitude control primarily in wingborne flight. The aircraft 500 is substantially symmetrical about the centerline in wingborne configuration, such that other than possibly being mirror images, rotors 510, nacelles 520, wings 530, and fuselage 540 features, are substantially identical.

FIG. 6A shows the first aircraft 100 having a rotor 110 with rotor diameter 412 of 29 feet.

FIG. 7A shows the first aircraft 100 with fuselage length dimension 410 of 41.8 feet. The internal payload bay extending from behind the cockpit 141 to line 711 has a length dimension 701 of 17 feet. FIG. 7B shows the second aircraft 500 with fuselage length dimension 710 of 48.8 feet. The internal payload bay of aircraft 500 extending from behind the cockpit 541 to line 712 has length dimension 702 of 24 feet.

Aircraft 100 and 500 have at least 80% commonality by part count of the "green aircraft". Green aircraft in the aero industry vernacular is the complete flying aircraft excluding parts of the aircraft not required for flight such as cabin furnishing, external paint and mission systems. In the case of a military aircraft the mission systems include the weapons system, sensor equipment and other mission-specific equipment. The level of part commonality is therefore maintained in the airframe, airframe folding (if so equipped), icing and lightning protection, propulsion, flight controls, landing gear, fuel system, electrical power system, lighting, cabin pressurization and air-conditioning, basic cockpit sensors and instruments, cockpit and cabin doors, windows and glazing. Interfaces between major components such as the wing to fuselage, wing to nacelle, and rotor blades to nacelles are common between variants.

As used herein, "percentage commonality by part count" refers only to parts that weigh more than one pound. This limitation is intended to prevent a potential competitor from circumventing the claims by adding a large number of tiny components such as ball bearings.

Viewed from another perspective, aircraft 100 and 500 have at least 80% commonality in power source and drivetrain, and more preferably at least 85% commonality in power source and drivetrain, and even more preferably at least 90% commonality in power source and drivetrain. In most preferred embodiments, the un-commonality in the power source and drivetrain is substantially limited to a single gearset in each nacelle.

Rotor rotational speed (RPM) of most rotorcraft is preferred to be high to carry the most lift in hover but is constrained by a maximum tip speed remaining below the speed of sound in all modes of flight. The rotor tip speed is a product of rotor RPM and rotor diameter. To maintain similar tip speeds required for lift in hover an aircraft with a smaller rotor requires a proportionally higher RPM. However, the output speed (RPM) of a conventional turboshaft engine at maximum power is constant. In a preferred embodiment of the aircraft, a single gearset 322 is replaced to maintain the desired gear ratio of engine RPM to rotor RPM for rotors of different diameters.

The aircraft according to teachings herein have rotor diameters in the range of 12 to 80 feet, inclusive. This range limitation excludes small aircraft which do not face the same rotor aero-structural dynamics challenges associated with large aircraft. Even larger rotors are contemplated, up to 90 or even 100 feet, and the drawing figures should be interpreted accordingly.

A minimum 10% difference of rotor diameter represents a significant change in rotor disk area and is meant to exclude minor modifications such as an exchangeable tip. Conventional rotor systems would require a reevaluation of the rotor system and drivetrain to accommodate rotor diameter modifications in excess of 10%. Even more significant changes in rotor diameters of 15%, 20% or even 24% are contemplated. As used herein, differences are measured from the lower number. For example, the difference between the 29 foot rotor diameter of FIG. 5A and the 36 foot rotor diameter of FIG. 5B is 24%. In contrast, conventional tiltrotor designs would require a redesign of the rotor system, drive system and structure to provide for aero-structural stability and to accept increased loads and different whirl flutter characteristics.

Rotors contemplated herein can be constructed using techniques identified in the above-referenced patents, U.S. Pat. No. 6,007,298 (Karem, OSR), and U.S. Pat. No. 6,641,365 (Karem, OSTR). Key characteristics are high stiffness and light weight. In accordance with the teachings of these two patents, aircraft contemplated herein would have total weight of each blade in lbs. that does not exceed 0.0015 times the diameter of the rotor in feet cubed. Flap stiffness of the blades, measured at 10% of the rotor radius, in lbs-in2 is not less than 25 times the diameter of the rotor in feet to the fourth power.

The combination of high stiffness and light weight characteristics avoids the problematic interaction of the blade's natural flap, lag, and torsional oscillation with the rotor excitation frequencies as described in the '365 patent. An exemplary embodiment described in the '365 patent utilizes carbon-epoxy advanced composite material to provide the high stiffness to weight ratio required. The blades are attached to a hub in a hingeless configuration, meaning there is no flap or lead-lag articulation at the blade root. The hingeless configuration maintains the required stiffness of the rotor system and allows the transfer of large moments from the rotor system to the aircraft structure for maneuvering.

When designing a fleet of aircraft with substantially different rotor diameters, but otherwise a very high level of commonality, additional benefits result from the use of lightweight rigid rotors. Continuous operation across a wide envelope of RPM, including for example 40% to 100% of maximum rotor RPM, allows optimal rotor RPM for flight at all airspeeds. This is contemplated to allow sustained in-flight operation with at least 25% reduction in RPM between hover and forward speed.

FIG. 14-20 of the '365 patent illustrate the beneficial power reduction and improved propeller efficiency associated with optimum speed tiltrotors compared to conventional tiltrotors. These benefits are operationally relevant to commercial and military applications because they reduce vehicle weight, cost, and fuel consumption for a given mission set. A multi-speed transmission can be used to provide full rotor RPM range while limited to the narrow RPM range of a turboshaft engine.

It is contemplated that a fleet of aircraft according to teachings herein include at least two aircraft, wherein a smallest and largest folded length dimensions of the aircraft differ by between 15% and 50%, inclusive. The folded length of the aircraft can be a result of the wingspan, rotor diameter, fuselage length, or other components which protrude from the aircraft's basic geometry. The range of difference in folded length is intended to exclude minor modifications which affect the folded length. The range is also limited to a difference in overall size where a common drivetrain would be inefficient or ineffective.

In a contemplated fleet, differences between smallest and largest manufacturers empty weight of aircraft can differ by between 15% and 50% of the first aircraft, inclusive. The range of difference in empty weight is intended to exclude minor modifications such as construction method or additional features. The range is also limited to a difference in overall size where a common drivetrain would be inefficient or ineffective.

Also in a contemplated fleet, differences between smallest and largest payload weight capacity can differ by between 500 and 50,000 pounds, inclusive. This range of difference in payload weight is also intended to exclude minor modifications of the rotor, propulsion, and fuselage which affect payload weight capacity. Rotor lift capability to power ratio is generally related to rotor diameter squared. Therefore, the preferred rotor diameter differences result in large lift and payload weight differences. A difference in fuselage length of the preferred embodiments accommodates the difference in payload weight capacity as well as differences in payload density relevant to different users. For example, carrying lower density payload such as soldiers requires a longer fuselage length compared to the same weight of a higher density payload such as water. In a contemplated fleet, the largest payload length dimension of the first and second aircraft differ by between 15% and 50%, inclusive.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. Unless a contrary meaning is explicitly stated, all ranges are inclusive of their endpoints, and open-ended ranges are to be interpreted as bounded on the open end by commercially feasible embodiments.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. An improved method of designing a fleet of tilt-rotor rotorcraft, wherein the improvement comprises
    designing a first aircraft of the fleet to have a first rotor with a largest rotor diameter that is at least 10% larger than a second rotor with a largest rotor diameter of the second aircraft, and the first aircraft to have a payload weight capacity between 500 and 50,000 pounds, inclusive, greater than a payload capacity of the second aircraft;
    accommodating the different rotor diameters and payload weight capacities of the first and a second aircraft, respectively, by:
        (a) designing each of the blades of each of the first and second rotors to have flap stiffness of the blades in lbs-in$^2$ is not less than 25 times the diameter of the rotor in feet to the fourth power, at 10% of the rotor radius; and
        (b) designing each of the first and second rotors to be powered through first and second cross wing driveshafts and first and second speed selectable gearboxes, respectively; and
    designing the first and second aircraft wherein the only parts difference in power source and drivetrain components between the first and the second aircraft are different gearsets.

2. The method of claim 1, further comprising designing each of the first and the second aircraft to sustain in-flight operation over a range of 40% to 100% of maximum rotor RPM over a continuous 20 minute period.

3. The method of claim 1, further comprising designing each of the first and the second aircraft to sustain in-flight operation with at least 25% reduction in RPM between hover and forward speed.

4. The method of claim 1, wherein each of the blades of each of the first and the second rotors has a blade root and a blade tip, and further comprising designing each of the blades of each of the first and second rotors such that the blade stiffness in flap, lag and torsion are continuously decreasing from the blade root to the blade tip.

* * * * *